US010853535B2

(12) United States Patent
Belyi

(10) Patent No.: US 10,853,535 B2
(45) Date of Patent: *Dec. 1, 2020

(54) ACCELERATED ALGORITHM FOR MODAL FREQUENCY RESPONSE CALCULATION

(71) Applicant: Dassault Systemes Simulia Corp., Johnston, RI (US)

(72) Inventor: Mikhail Belyi, Johnston, RI (US)

(73) Assignee: DASSAULT SYSTEMES SIMULIA CORP., Johnston, RI (US)

( * ) Notice: Subject to any disclaimer, the term of this patent is extended or adjusted under 35 U.S.C. 154(b) by 503 days.

This patent is subject to a terminal disclaimer.

(21) Appl. No.: 15/457,388

(22) Filed: Mar. 13, 2017

(65) Prior Publication Data

US 2017/0185706 A1    Jun. 29, 2017

Related U.S. Application Data

(63) Continuation of application No. 13/730,403, filed on Dec. 28, 2012, now Pat. No. 9,626,463.

(51) Int. Cl.
    *G06F 30/20*       (2020.01)
    *G06F 111/10*      (2020.01)
(52) U.S. Cl.
    CPC .......... *G06F 30/20* (2020.01); *G06F 2111/10* (2020.01)
(58) Field of Classification Search
    None
    See application file for complete search history.

(56) References Cited

U.S. PATENT DOCUMENTS

| 4,034,191 | A | * | 7/1977 | Tomlinson | G01R 23/16 |
| | | | | | 702/77 |
| 4,630,612 | A | | 12/1986 | Uchida et al. | |
| 5,537,329 | A | * | 7/1996 | Feldmann | G06F 30/367 |
| | | | | | 703/14 |
| 5,579,243 | A | | 11/1996 | Levine | |
| 5,870,691 | A | | 2/1999 | Partyka et al. | |
| 6,348,015 | B1 | | 2/2002 | Kosmatka | |
| 6,763,310 | B2 | | 7/2004 | Lafleur et al. | |
| 7,188,039 | B2 | | 3/2007 | Bennighof | |
| 7,616,523 | B1 | | 11/2009 | Tabti et al. | |
| 8,306,793 | B2 | | 11/2012 | Huang et al. | |
| 8,861,308 | B2 | | 10/2014 | Virgilio et al. | |
| 9,626,463 | B2 | * | 4/2017 | Belyi | G06F 30/20 |
| 2003/0191598 | A1 | | 10/2003 | Normen | |
| 2003/0229476 | A1 | | 12/2003 | Naganarayana et al. | |

(Continued)

OTHER PUBLICATIONS

A. Muszynska, "Modal Testing of Rotors with Fluid Interaction", pp. 83-116, 1995. (Year: 1995).*

(Continued)

*Primary Examiner* — Kibrom K Gebresilassie
(74) *Attorney, Agent, or Firm* — Hamilton, Brook, Smith and Reynolds, P.C.

(57) ABSTRACT

A computer-implemented method is provided for simulating a modal frequency response of a real-world object. The computer-implemented method includes dividing a plurality of excitation frequencies into a plurality of excitation frequency subsets, calculating modal frequency responses for at least a portion of the excitation frequencies in a given excitation frequency subset, and generating a simulation of the real-world object based at least in part on the modal frequency responses.

20 Claims, 3 Drawing Sheets

(56) References Cited

U.S. PATENT DOCUMENTS

| | | |
|---|---|---|
| 2004/0093191 A1 | 5/2004 | Jeppsson et al. |
| 2005/0146512 A1* | 7/2005 | Hill ................... G06F 3/0436 |
| | | 345/173 |
| 2005/0171742 A1* | 8/2005 | Bennighof ............ G06F 17/11 |
| | | 702/196 |
| 2007/0034009 A1 | 2/2007 | Pado |
| 2007/0219763 A1 | 9/2007 | Smith et al. |
| 2009/0090166 A1 | 4/2009 | Talley et al. |
| 2009/0120401 A1 | 5/2009 | Dopke et al. |
| 2009/0273600 A1 | 11/2009 | Satou |
| 2011/0301929 A1 | 12/2011 | Huang et al. |
| 2012/0007583 A1 | 1/2012 | Märtens et al. |
| 2014/0150139 A1 | 5/2014 | Moon |
| 2014/0188443 A1 | 7/2014 | Belyi |
| 2014/0216158 A1* | 8/2014 | Sanabria Martin .... G01N 29/06 |
| | | 73/588 |
| 2018/0069576 A1* | 3/2018 | Dark ................... H04L 7/0041 |

OTHER PUBLICATIONS

A. Muszynaska, "Modal Testing of Rotors with Fluid Interaction", pp. 83-116, 1995.

CDH Software, Fast Frequency Response Solver, [retrieved on Nov. 5, 2012] Retrieved from the Internet URL: http:\\www.cdh-ag.com/de/fastfr.html.

David, C.D. and Kienholz, D.A., "Prediction of Damping in Structures With Viscoelastic Materials", CSA Engineering, Inc., Palo Alto, CA.

* cited by examiner

ACCELERATED ALGORITHM FOR MODAL FREQUENCY RESPONSE CALCULATION

RELATED APPLICATION

This application is a continuation of U.S. application Ser. No. 13/730,403, filed Dec. 28, 2012, Now U.S. Pat. No. 9,626,463. The entire teachings of the above application are incorporated herein by reference.

BACKGROUND

The embodiments described herein relate generally to simulation engineering systems and, more particularly, to calculation of modal frequency responses in simulation engineering systems.

BRIEF DESCRIPTION OF THE INVENTION

In one aspect, a computer-implemented method is provided for simulating a modal frequency response of a real-world object. The computer-implemented method includes dividing a plurality of excitation frequencies into a plurality of excitation frequency subsets, effectively calculating modal frequency responses for at least a portion of the excitation frequencies in a given excitation frequency subset, and generating a simulation of the real-world object based at least in part on the modal frequency responses.

In another aspect, a computer device is provided for use in simulating a modal frequency response of a real-world object. The computer device includes a memory area and a processor coupled to the memory area. The processor is configured to divide a plurality of excitation frequencies into a plurality of excitation frequency subsets, store the excitation frequency subsets and the excitation frequencies assigned to each subset in the memory area, effectively calculate modal frequency responses for at least a portion of the excitation frequencies in a given excitation frequency subset, and generate a simulation of the real-world object for display to a user, based at least in part on the modal frequency responses.

In another aspect, a computer program product includes one or more non-transitory computer-readable storage media having computer-executable components for use in simulating a modal frequency response of a real-world object. The components include a division component that when executed by a processor causes the processor to divide a plurality of excitation frequencies into a plurality of excitation frequency subsets, and store the excitation frequency subsets and the excitation frequencies assigned to each subset in a memory area. The components also include a calculation component that when executed by a processor causes the processor to effectively calculate modal frequency responses for at least a portion of the excitation frequencies in a given excitation frequency subset, and a simulation component that when executed by a processor causes the processor to generate a simulation of the real-world object based at least in part on the modal frequency responses.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
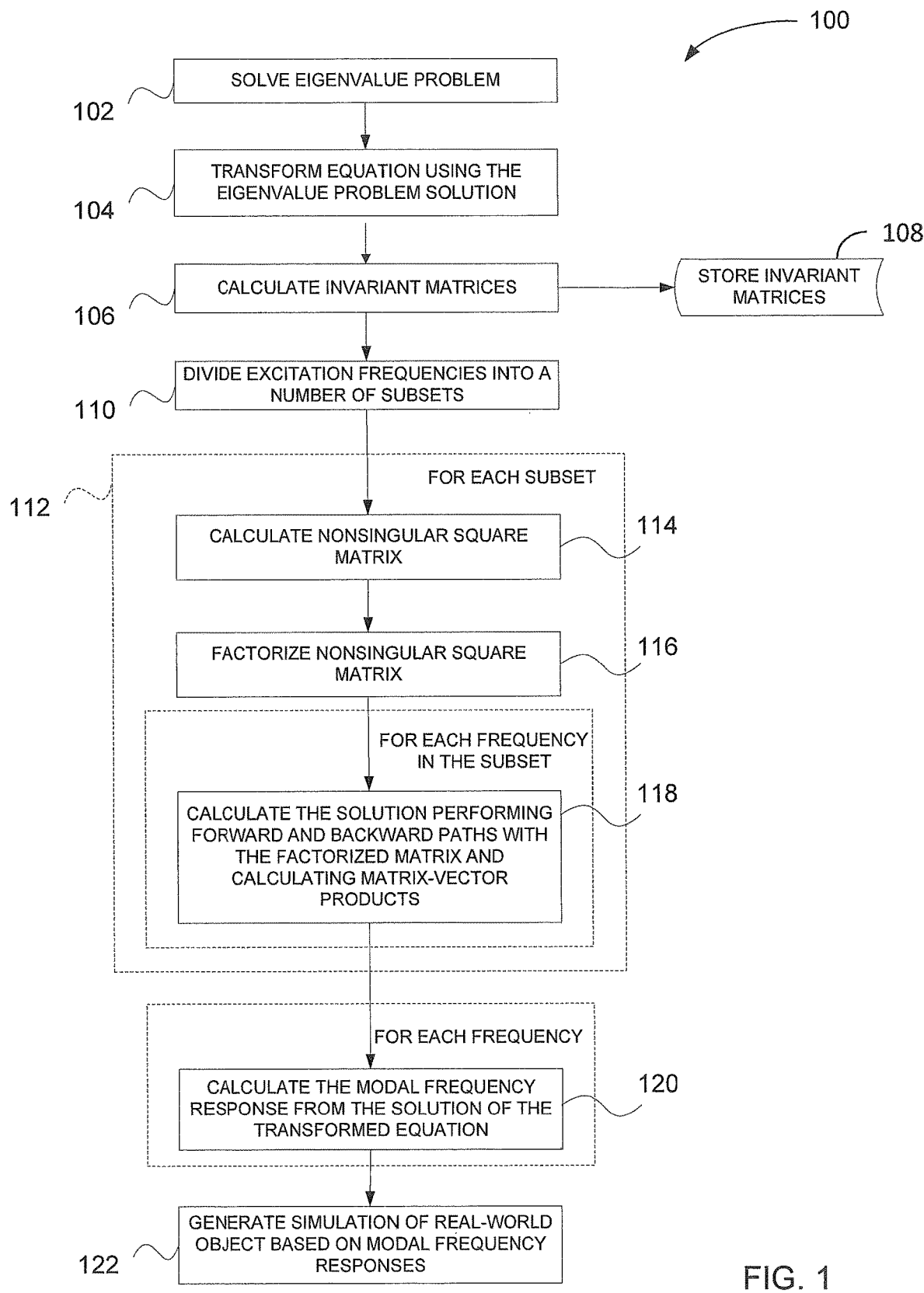
FIG. 1 is a flowchart that illustrates an exemplary method for simulating a modal frequency response of a real-world object.

A description of example embodiments of the invention follows.

Exemplary embodiments of computer-implemented methods, computer systems, computer devices, and computer program products for use in simulating a modal frequency response of a real-world object are described herein. The embodiments described herein facilitate an accelerated method for calculating a modal frequency response based on a plurality of time-harmonic excitation frequencies, a reduced structural stiffness matrix based on properties of the real-world object, a structural damping matrix based on properties of the real-world object, and a viscous damping matrix based on properties of the real-world object. Moreover, the embodiments described herein provide increased efficiency of modal frequency response calculations and reduced computational costs in terms of computing time and power.

Frequency response analysis is often used to calculate structural response of real-world objects, such as automobiles, buildings, ships, aircrafts, and other engineering systems, to steady-state time-harmonic excitation. The frequency response problem for such structures simulated with the finite element method can be defined by Equation (1), which has to be solved at every frequency from a given set of excitation frequencies.

$$(B + i\omega C - \omega^2 M)U = F(\omega), \omega \in \{\omega_1, \omega_2, \ldots, \omega_n\} \qquad \text{Eq. (1)}$$

In Equation (1), $\omega$ is the angular frequency of the time-harmonic excitation, $i = \sqrt{-1}$, and M is the mass matrix which is real, symmetric and positive-semi-definite. Moreover, $B = K + iS$ is the complex stiffness matrix where K is the structural stiffness matrix, and S is the structural damping matrix. Also in Equation (1), C is the viscous damping matrix. Matrices K, S, and C are real-valued matrices that can be symmetric or asymmetric due to the mechanical effects that are modeled. F is the load matrix that may depend on the excitation frequency and may be complex. Columns of the matrix F represent complex load vectors associated with the harmonic excitation. Each column of the complex response matrix U of Equation (1) represents response of the structure to the corresponding load vector in the matrix F.

In many engineering applications, there may be millions of equations and those equations can be solved at thousands of frequencies. A direct or iterative solution of such applications using Equation (1) at each frequency is not usually feasible because of the computational cost, such as expensive hardware and/or long periods needed for processing. A modal approximation is a well-established method which is commonly used to reduce the computational cost of solving such applications. The frequency response is represented in the form shown in Equation (2):

$$U = \Phi \overline{X} \quad \text{Eq. (2)}$$

where $\overline{X}$ is the modal frequency response, also called generalized displacements, and $\Phi$ is the rectangular matrix of the modal subspace containing m modal vectors as columns. Usually, these vectors are the free-vibration mode shapes of the finite element model, but they can be accompanied by some other vectors as well, to enhance the accuracy of the solution. The modal subspace vectors are assumed to be mass-normalized as shown in Equation (3):

$$\Phi^T M \Phi = \overline{I} \quad \text{Eq. (3)}$$

where $\overline{I}$ is an m×m identity matrix. Here and below the upper bar indicates that the matrix includes m rows.

The generalized displacements $\overline{X}$ are obtained by solving the modal frequency response problem shown in Equation (4):

$$(\overline{B} + i\omega\overline{C} - \omega^2 \overline{I})\overline{X} = \overline{F}(\omega), \omega \in \{\omega_1, \omega_2, \ldots, \omega_n\} \quad \text{Eq. (4)}$$

where $\overline{B} = \overline{K} + i\overline{S} = \Phi^T K \Phi + i \Phi^T S \Phi$, and $\overline{F} = \Phi^T F$ Equation (4) is of order m, and is much smaller than Equation (1) in terms of necessary calculations, and as such is much more efficient and requires less computational power and/or processing time. However, in practical engineering simulations m can still be in the thousands or tens of thousands of modes, or number of equations. Thus, even solving Equation (4) at every excitation frequency may still be costly.

It general, solving the modal frequency response problem includes factorizing a complex dense square matrix of order m at every frequency. The total number of arithmetic operations with the complex numbers in the modal frequency response calculation may be estimated as shown in Equation (5):

$$W_0 = \delta \frac{nm^3}{3} + O(m^2) \quad \text{Eq. (5)}$$

Here and below, standard Big O (i.e., O) notation is used in the algorithm performance estimates. The coefficient $\delta$ in Equation (5) depends on the matrix symmetry, such that $\delta=1$ if the matrix is symmetric and $\delta=2$ if the matrix is asymmetric.

If any or all of the matrices $\overline{K}$, $\overline{C}$, and $\overline{S}$ are diagonal, sparse, or have some special properties, then computational techniques may be developed that take into account the matrix structure and properties to reduce the amount of computation for the modal frequency response calculation. When all of the matrices $\overline{K}$, $\overline{C}$, and $\overline{S}$ are diagonal, the solution is not costly at all because the matrix of the system shown in Equation (4) is diagonal. To take advantage of the special structure of the matrices $\overline{K}$, $\overline{C}$, and $\overline{S}$ in other cases, Equation (4) may be written as a system of equations with respect to the real and imaginary parts of the response, as shown in Equation (6).

$$\begin{bmatrix} (\overline{K} - \omega^2 \overline{I}) & -(\omega\overline{C} + \overline{S}) \\ -(\omega\overline{C} + \overline{S}) & -(\overline{K} - \omega^2 \overline{I}) \end{bmatrix} \begin{bmatrix} \overline{X}_{Re} \\ \overline{X}_{Im} \end{bmatrix} = \begin{bmatrix} \overline{F}_{Re} \\ -\overline{F}_{Im} \end{bmatrix} \quad \text{Eq. (6)}$$

In many practical cases the modal stiffness matrix $\overline{K}$ may be diagonal such that the cost of solving Equation (6) is reduced by a factor of at least two. Further reduction of computational work may be achieved by taking into account the sparse structure of the left hand side of Equation (6) for certain special cases.

In some known dynamic simulation applications, either of the damping matrices $\overline{C}$ or $\overline{S}$ may be of relatively low rank. For such cases, some known methods apply the approach wherein the modal frequency response problem defined in Equation (4) is transformed to an equation with a "diagonal plus low rank" matrix by means of algebraic operations with matrices of order m, such as solving eigenvalue problems and computing singular value decompositions. The "diagonal plus low rank" frequency response problem can then be solved at each frequency. Such methods can significantly reduce the computational cost of frequency response calculations when the rank of the damping matrices is low (e.g., less than about 50). However, such methods do not reduce computational cost in the general case.

Other known methods diagonalize the matrix of the system of equations by solving an eigenvalue problem. In such methods, the quadratic eigenvalue problem associated with Equation (4) is transformed to the standard form using a state-space formulation. In the general case, this transformation results in the eigenvalue problem with a complex asymmetric matrix of the order 2·m. Solving this eigenvalue problem can be costly. Such methods may be more efficient in some cases than the approach of factorizing the matrix in Equation (4) at each frequency, but the difference in computational cost is not significant in many other practical cases.

In some automotive, ship, and airspace structural simulations, the matrices $\overline{K}$, $\overline{C}$, and $\overline{S}$ may be fully populated real-valued dense matrices that can be symmetric or asymmetric due to the mechanical nature of simulation. Thus, there is a need for an effective method of solving the modal frequency response problem in the general case of the matrices $\overline{K}$, $\overline{C}$, and $\overline{S}$.

Exemplary technical effects of the computer-implemented methods, computer systems, computer architectures, and computer program products described herein are based on the concept shown in Equation (7), wherein the set of excitation frequencies is partitioned into smaller portions of frequencies with a maximum of N frequencies per portion, assuming that N is significantly smaller than n and m, or N<<n and N<<m.

$$\{\omega_1, \ldots, \omega_N; \omega_{N+1}, \ldots, \omega_{2N}; \ldots \omega_{(k-1)N+1}, \ldots, \omega_{(k-1)N}; \ldots\} \quad \text{Eq. (7)}$$

Enhanced efficiency of the frequency response calculation is achieved by the embodiments herein by effective processing equations at all frequencies within a portion. In some embodiments, high performance implementation of such processing may require one or more preparatory calculations be performed and/or some data be stored in a memory area prior to computing the frequency response for all groups of frequencies. The performance and/or efficiency gain from the embodiments described herein can be measured by the ratio between the computational costs of the accelerated frequency response calculation for a portion of frequencies to the cost of solving the modal frequency response equation of Equation (4) at every frequency in the portion one-by-one.

To describe the approach to processing equations at all frequencies within a portion, consider N generic systems of linear algebraic equations with nonsingular square matrices of order m, as shown in Equation (8)

$$A_k x_k = f_k, k = 1, \ldots, N \quad \text{Eq. (8)}$$

and introduce the matrix shown in Equation (9).

$$A = A_1 A_2 \ldots A_N \quad \text{Eq. (9)}$$

Combining the two, solutions of all systems in Equation (8) can be represented as shown in Equation (10).

$$x_1 = A_2 A_3 \ldots A_N A^{-1} f_1, \ldots, x_k = A_{k+1} \ldots A_N A^{-1} A_1 \ldots A_{k-1} f_k, \ldots, x_N = A^{-1} A_1 \ldots A_{N-1} f_N \quad \text{Eq. (10)}$$

Calculations using Equations (9) and (10) include N−1 matrix products in Equation 9 and one matrix factorization, N forward and backward paths with the factorized matrix, and a limited number of matrix-vector products that all have computational complexity O ($m^2$). If the matrix A is obtained in O ($m^2$) operations rather than in N−1 direct matrix multiplications, then solutions of all of the systems of equations shown in Equation (8) would require a single matrix factorization that is approximately N times faster than solving the systems of equations one-by-one. While that is not achievable in the general case, it can be achieved if the matrices $A_k$ have special structure. Let matrices $A_k$ have a structure as shown in Equation (11):

$$A_k = D_k + G = \alpha_k I + \beta_k \Gamma + G, k=1, \ldots, N \quad \text{Eq. (11)}$$

where I and Γ are diagonal matrices and G is a square dense matrix. More specifically, in Equation (11) I=diag(1, . . . , 1), Γ=diag($\gamma_1$, . . . , $\gamma_m$), and $D_k = \alpha_k I + \beta_k \Gamma$. The product of Equation (9) of the matrices of Equation (11) can be obtained by the computer device in O($m^2$) operations if certain products of the square matrix G and diagonal matrix Γ are pre-calculated and stored in the memory area.

If N=2, and the matrices G and $G^2$ are stored, then the matrix A can be calculated by the computer device in O($m^2$) operations as shown in Equation (12).

$$A = D_1 D_2 + D_1 G + G D_2 + G^2 \quad \text{Eq. (12)}$$

If N=3, and the matrices G, $G^2$, and $G^3$ are stored, then the matrix A can be calculated by the computer device in O($m^2$) operations as shown in Equation (13).

$$A = D_1 D_2 D_3 + D_1 D_2 G + D_1 G D_3 + D_1 G^2 + G D_2 D_3 + G^2 D_3 + G^3 + \alpha_2 G^2 + \beta_2 G \Gamma G \quad \text{Eq. (13)}$$

If N=4, and the matrices G, $G^2$, $G^3$, $G^4$, GΓG, G$\Gamma^2$G, $G^2 \Gamma G$, and $G \Gamma G^2$ are stored, then the matrix A can be calculated by the computer device in O($m^2$) operations as shown in Equation (14).

$$A = D_1 D_2 D_3 D_4 + D_1 D_2 D_3 G + D_1 D_2 G D_4 + D_1 G D_3 D_4 + G D_2 D_3 D_4 + D_1 D_2 G^2 + D_1 G^2 D_4 + G^2 D_3 D_4 + D_1 G^3 + G^3 D_4 + G^4 + \alpha_2 G^2 D_4 + \alpha_3 D_1 G^2 + \beta_2 G \Gamma G D_4 + \beta_3 D_1 G \Gamma G + \alpha_2 \alpha_3 G^2 + (\alpha_2 \beta_3 + \alpha_3 \beta_2) G \Gamma G + \beta_2 \beta_3 G \Gamma^2 G + (\alpha_2 + \alpha_3) G^3 + \beta_2 G \Gamma G^2 + \beta_3 G^2 \Gamma G \quad \text{Eq. (14)}$$

Other expressions for the matrix A can be derived for larger values of N, but they may be of less practical value because of larger numbers of terms on the right-hand side and larger amount of the matrix data to be stored in the memory area.

Consider how the general approach described above is applied to solve the modal frequency response problem. To simplify the following description, Equation (4) above can be rewritten for a portion of the excitation frequencies, i.e., for a given excitation frequency subset of N frequencies, as shown in Equation (15).

$$(\overline{B} + i\omega \overline{C} - \omega^2 \overline{I}) \overline{X} = \overline{F}(\omega), \omega \in \{\omega_1, \omega_2, \ldots, \omega_N\} \quad \text{Eq. (15)}$$

Equations (8) through (14) can be used to solve the modal frequency response problem of Equation (15) for small portions of frequencies as described below.

First, consider a special case of the modal frequency response analysis when the modal viscous damping matrix is zero, i.e., $\overline{C}=0$. Equation (15) thus reduces to the form shown in Equation (16) for this special case.

$$\overline{A}_k \overline{X}_k = \overline{F}_k, k=1, \ldots, N \quad \text{Eq. (16)}$$

where $\overline{A}_k = \overline{B} - \lambda_k \overline{I}$, $\overline{F}_k = \overline{F}(\omega_k)$, and $\lambda_k = \omega_k^2$. The matrices $\overline{A}_k$ are permutable, therefore the product of these matrices can be presented in the form of Equation (17).

$$\overline{A} = \overline{A}_1 \overline{A}_2 \ldots \overline{A}_N = p(\overline{B}) \quad \text{Eq. (17)}$$

where p is a polynomial of order N defined by its roots $\lambda_1$, $\lambda_2$, . . . , $\lambda_N$ as shown in Equation (18).

$$p(\lambda) = (\lambda - \lambda_1)(\lambda - \lambda_2) \ldots (\lambda - \lambda_N) = a_0 + a_1 \lambda + \ldots + a_{N-1} \lambda^{N-1} + a_N \lambda^N \quad \text{Eq. (18)}$$

The coefficients $a_0, a_1, \ldots, a_N$ can be calculated by well known Vieta's formulas or by a simple algorithm. If the powers of the matrix $\overline{B}$, namely $\overline{B}, \overline{B}^2, \ldots, \overline{B}^N$, are pre-calculated and stored in the computer memory, then the matrix defined in Equation (17) can be obtained in O($m^2$) operations.

The modal frequency response is calculated by the computer device for a portion, or subset, of N frequencies as shown in Equation (19).

$$\overline{X}_k = [p(\overline{B})]^{-1} p_k(\overline{B}) \overline{F}_k, k=1, \ldots, N \quad \text{Eq. (19)}$$

where $$p_k(\overline{B}) = \prod_{\substack{j=1 \\ j \neq k}}^{N} (\overline{B} - \lambda_k \overline{I}).$$

Calculation of the frequency response at each frequency in the subset is based on a single complex matrix factorization. The total cost of solving the modal frequency response problem with zero viscous damping including the cost of preparatory calculations estimates as shown in Equation (20).

$$W_1 = \delta(N - 1 + n/3N) m^3 + O(m^2) \quad \text{Eq. (20)}$$

The optimal partitioning of the excitation frequencies that minimizes the principal, $m^3$-proportional term in Equation (20) is $$N_{opt} = \sqrt{\frac{n}{3}}.$$

For example, if n=1000 and N=$N_{opt}$=18, then $W_1 \approx 0.1 \cdot W_0$. Using N<$N_{opt}$ can be more practical in some embodiments if storage space of the matrices $\overline{B}^2, \ldots, \overline{B}^N$ in the memory area is limited. For example, if N=4, then $W_1 \approx 0.26 \cdot W_0$.

Now we describe solution of the modal frequency response problem (15) for a portion of frequencies in the general case, wherein the matrix on the left-hand side of Equation (15) is transformed to the form of Equation (11). This transformation can be performed using the modal viscous damping matrix $\overline{C}$ or the matrix $\overline{B}$ eigenvectors.

Consider the first approach to the left hand side of Equation (15) transformation based on the modal viscous damping matrix $\overline{C}$ eigenvectors. The computer solves the eigenvalue problem for the matrix $\overline{C}$ as shown in Equation (21).

$$\overline{C} \overline{\Psi} = \overline{\Psi} \overline{\Xi}, \overline{\Xi} = \text{diag}(\xi_1, \ldots, \xi_m) \quad \text{Eq. (21)}$$

Solving the eigenvalue problem as shown enables to transform Equation (15) (11) as shown in Equation (22).

$$(-\omega_k^2 \overline{I} + i \omega_k \overline{\Xi} + \overline{\Psi}^{-1} \overline{B} \overline{\Psi}) \overline{Y}_k = \overline{\Psi}^{-1} \overline{F}(\omega_k), k=1, \ldots, N \quad \text{Eq. (22)}$$

where $\overline{Y}_k = \overline{\Psi}^{-1}\overline{X}_k$. If the matrix $\overline{C}$ is symmetric such that ($\overline{C} = \overline{C}^T$), then the eigenvectors of Equation (21) can be normalized to satisfy $\overline{\Psi}^{-1} = \overline{\Psi}^T$. The matrix on the left-hand side of Equation (22) also has the form of Equation (15), wherein $\alpha_k = \omega_k^2$, $\beta_k = i\omega_k$, $\overline{\Gamma} = \overline{\Xi}$, and $\overline{G} = \overline{\Psi}^{-1}\overline{B}\overline{\Psi}$.

Consider the second approach to the left hand side of Equation (15) transformation based on the matrix $\overline{B}$ eigenvectors. The computer solves the eigenvalue problem for the matrix $\overline{B}$, as shown in Equation (23):

$$\overline{B}\overline{\Theta} = \overline{\Theta}\overline{H}, \overline{H} = \text{diag}(\eta_1, \ldots, \eta_m) \qquad \text{Eq. (23)}$$

and Equation (15) can be transformed as shown in Equation (24):

$$(i\omega_k\overline{I} - i\omega_k^{-1}\overline{H} + \overline{\Theta}^{-1}\overline{C}\overline{\Theta})\overline{Y}_k = -i\omega_k^{-1}\overline{\Theta}^{-1}\overline{F}(\omega_k), k=1, \ldots, N \qquad \text{Eq. (24)}$$

where $\overline{Y}_k = \overline{\Theta}^{-1}\overline{X}_k$, and it is assumed that $\omega_k \neq 0$. If the matrix $\overline{\beta}$ is symmetric and real such that $\overline{K} = \overline{K}^T$ and $\overline{S} = 0$, then the computer normalizes the eigenvectors of Equation (23) to satisfy $\overline{\Theta}^{-1} = \overline{\Theta}^T$. The matrix of Equation (24) then has the form of Equation (11) wherein $\alpha_k = i\omega_k$, $B_k = i\omega_k^{-1}$, $\overline{\Gamma} = \overline{H}$, and $\overline{G} = \overline{\Theta}^{-1}\overline{B}\overline{\Theta}$.

The computer transforms Equation (15) to Equations (22) or Equation (24) depending on what eigenproblem in Equations (21) or (23) is less expensive to solve in terms of the number of operations and/or processing time. For example, if the matrix $\overline{C}$ is symmetric, then the computer transforms Equation (15) to Equation (22). However, if the matrix $\overline{C}$ is asymmetric then the computer transforms Equation (15) to Equation (24), especially if the stiffness matrix $\overline{K}$ is symmetric and the structural damping matrix is zero, i.e., $\overline{S} = 0$. In the very general case, using transformation Equations (21) or (22) is more effective because this transformation can be performed without solving the eigenvalue problem with a complex matrix.

Thus, in the general case, the modal frequency response problem is transformed to the form of Equation (22) or Equation (24), and the computer then calculates the modal frequency response for a portion or subset of N frequencies in $$\delta\frac{m^3}{3} + O(m^2)$$

operations. The total cost of solving the modal frequency problem using the proposed method in the general case can be expressed using Equation (25):

$$W_2 = W_t + \delta\left(2^{N-1} - 1 + \frac{n}{3N}\right)m^3 + O(m^2) \qquad \text{Eq. (25)}$$

where $W_t$ is the cost of transformation of Equation (22) or Equation (24), including the cost of solving the corresponding eigenvalue problem of Equation (21) or Equation (23). The right hand side of Equation (25) includes the cost of preparatory calculations of invariant square dense matrices.

The approach described above can be implemented in a form of a high-performance computer program using optimized software for blocked matrix operations. The majority of operations used in the algorithm can be implemented using level 3 BLAS library. Parallel implementation of the method can enhance performance significantly.

FIG. 1 is a flowchart 100 that illustrates an exemplary method for simulating a modal frequency response of a real-world object. In an exemplary embodiment, if the viscous damping in the model is nonzero due to the nature of the simulation, a computer device solves 102 the eigenvalue problem defined by Equation (21) or Equation (23) and transforms 104 Equation (15) to Equation (22) or Equation (24), respectively. In an exemplary embodiment, a computer calculates 106 a plurality of square dense matrices that are invariant to the excitation frequency value and stores 108 the square dense matrices in a memory area. These invariant square dense matrices can be the powers of the matrix $\overline{B}$, in the case of simulation with zero viscous damping, or these matrices can be products of the square matrix G and diagonal matrix $\Gamma$ described above. In an exemplary embodiment, a computer device divides 110 a plurality of excitation frequencies into a plurality of excitation frequency subsets. The computer device effectively calculates 112 solutions for each frequency subset. Specifically, the computer device effectively calculates 114 a nonsingular square matrix defined by Equation (9) using the pre-calculated invariant square dense matrices stored in the memory area, after that the computer device factorizes 116 this matrix. The computer device then calculates 118 solutions for each frequency in the subset performing forward and backward paths with the factorized matrix and calculating matrix-vector products. In the general case, the computer device calculates the solutions of transformed Equations (22) or (24), while in the special case of simulation with zero viscous damping the modal frequency response is obtained by this calculation. Thus, in an exemplary embodiment, after processing all subsets of frequencies the computer device can calculate 120 the frequency responses at each frequency from the solution of transformed problem. Finally the computer device generates 122 a simulation of the real-world object based at least in part on the modal frequency responses.

Figure 2:
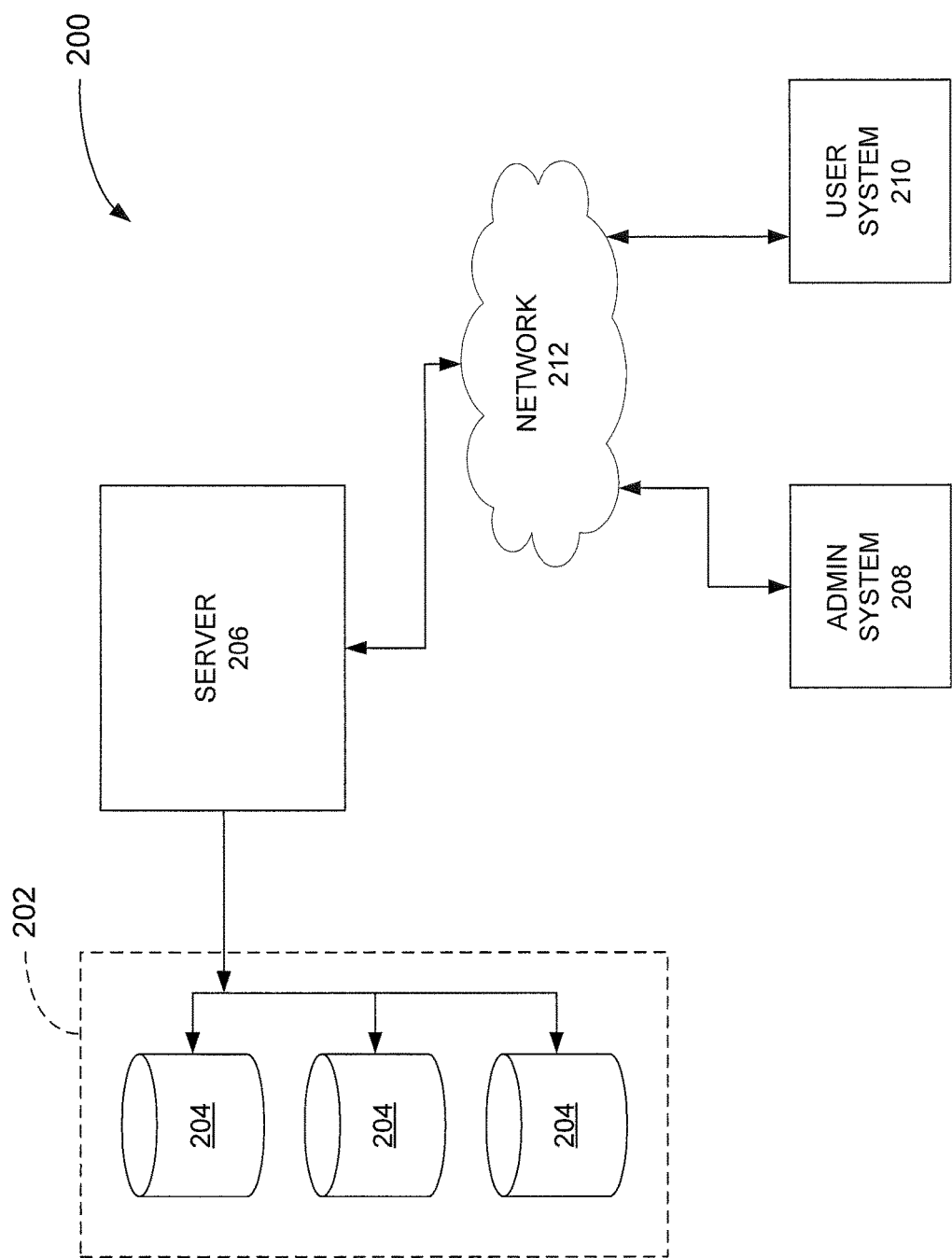
FIG. 2 is a schematic block diagram of an exemplary computer system for use with the flowchart shown in FIG. 1.

FIG. 2 is a schematic block diagram of an exemplary computer system 200 for use in simulating a modal frequency response of a real-world object, and/or for use in performing the processes described above and/or additional processes that may be related to those described above. In an exemplary embodiment, a memory area 202 includes one or more storage devices 204 for use in storing data, such as excitation frequencies, subsets of excitation frequencies, square dense matrices, diagonal matrices, modal frequency responses, and models of real-world objects, such as three-dimensional models. The storage devices 204 may be embodied as one or more databases, may be located at a single or at multiple geographical sites, or may be integrated with a server system 206. In some embodiments, the memory area 202 is coupled to the server system 206, which is in turn coupled to client devices such as one or more administrator systems 208 and/or one or more user systems or devices 210, via a network 212. Administrator systems 208 and/or user systems 210 may be any computer device device including, but not limited to only including, desktop computers, laptop computers, tablet computers, and/or smartphones.

As can be appreciated, the network 212 can be a public network, such as the Internet, or a private network such as an LAN or WAN network, or any combination thereof and can also include PSTN or ISDN sub-networks. The network 212 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 212 is merely exemplary and in no way limits the scope of the present advancements.

The user systems 210 can be any suitable computer architecture such as the one described below with reference to FIG. 3, or any other computing architecture that is known. Moreover, it should be understood that the server system 206 is configured to perform the processes described above and/or any additional processes that may be related to those described above.

The server system 206 stores computer-readable instructions to execute the processes described above, and provides these instructions via the network 212 to the administration systems 208 and/or the user systems 210. Moreover, the server system 206 can also provide data from the memory area 202 as needed to the user systems 210 such that the user systems 210 execute the processes described above. As such, FIG. 2 includes implementations of the computer system 200 via cloud computing, distributed computing, and the like.

The user systems 210 can be any suitable computer architecture such as the one described below with reference to FIG. 3, or any other computing architecture that is known. Moreover, it should be understood that the server system 206 is configured to perform the processes described above and/or any additional processes that may be related to those described above.

During operation, and if the viscous damping in the model is nonzero due to the nature of the simulation, the server system 206 solves the eigenvalue problem defined by Equation (21) or Equation (23) and transforms Equation (15) to Equation (22) or Equation (24), respectively. In an exemplary embodiment, the server system 206 calculates a plurality of square dense matrices that are invariant to the excitation frequency value and stores the square dense matrices in memory area 202. These invariant square dense matrices can be the powers of the matrix $\overline{B}$, in the case of simulation with zero viscous damping, or these matrices can be products of the square matrix G and diagonal matrix F described above. In an exemplary embodiment, the server system 206 divides a plurality of excitation frequencies into a plurality of excitation frequency subsets. Referring to FIG. 1, and in an exemplary embodiment, the server system 206 effectively calculates solution for each frequency subset. Specifically, the server system 206 effectively calculates a nonsingular square matrix defined by Equation (9) using the pre-calculated invariant square dense matrices stored in the memory area, after that the server system 206 factorizes this matrix. The server system 206 then calculates solutions for each frequency in the subset performing forward and backward paths with the factorized matrix and calculating matrix-vector products. In the general case, the server system 206 calculates the solutions of transformed Equations (22) or (24), while in the special case of simulation with zero viscous damping the modal frequency response is obtained by this calculation. Thus, in an exemplary embodiment, after processing all subsets of frequencies, the server system 206 calculates the frequency responses at each frequency from the solution of transformed problem. Finally, the server system 206 generates a simulation of the real-world object based at least in part on the modal frequency responses. The simulation is then displayed to a user via a user system 210.

Figure 3:
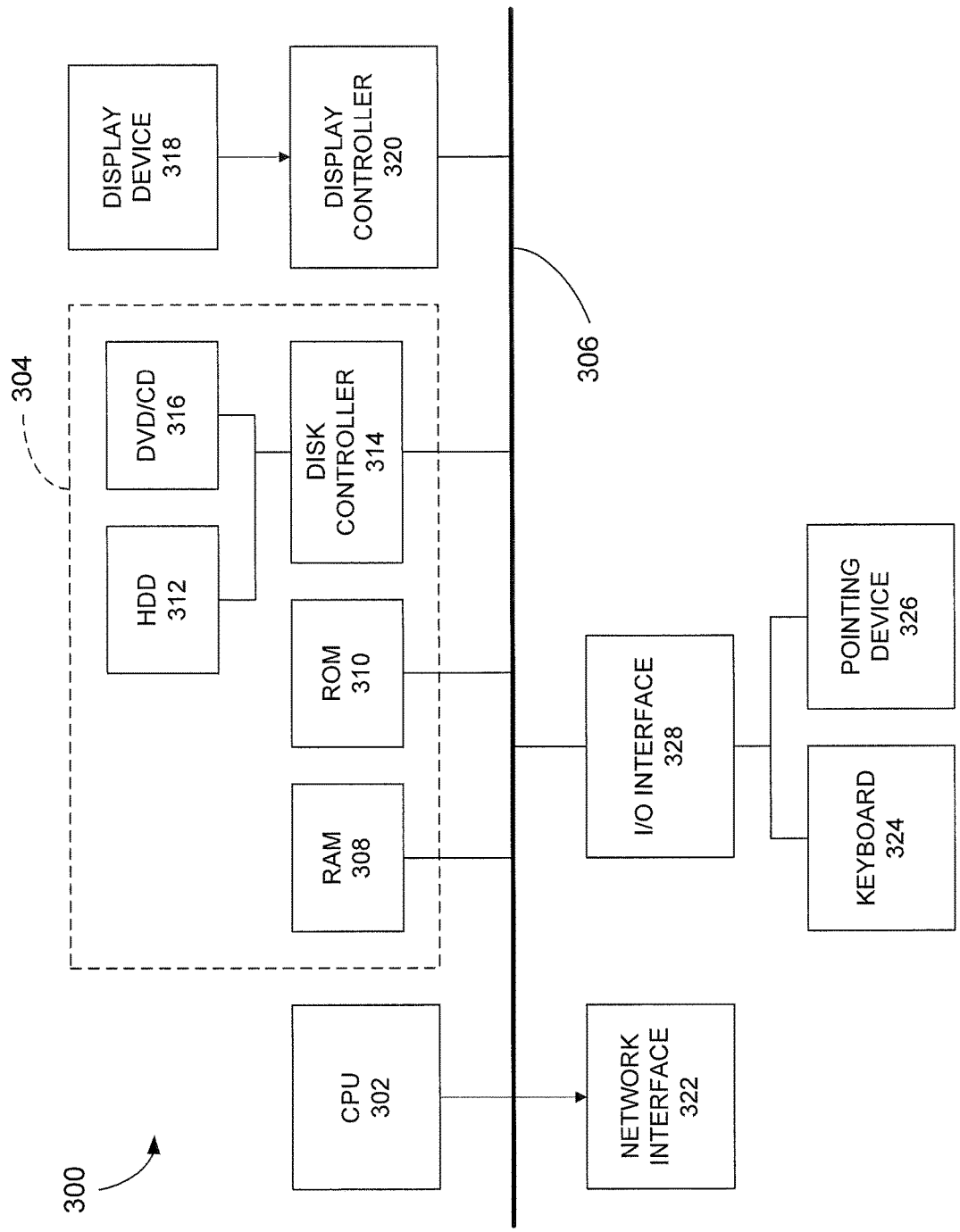
FIG. 3 is a schematic block diagram of an exemplary computer architecture for use with the flowchart shown in FIG. 1.

FIG. 3 is a schematic block diagram of an exemplary computer architecture 300 for use with the server system 206, the administration systems 208, and/or the user systems 210 (each shown in FIG. 2).

In an exemplary embodiment, the computer architecture 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 304 that is operably and/or communicatively coupled to the processor 302 by a system bus 306. A "memory area," as used herein, refers generally to any means of storing non-transitory program code and instructions executable by one or more processors to aid in simulating a modal frequency response of a real-world object, and/or for use in performing the processes described above and/or additional processes that may be related to those described above. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-programmable read-only memory (EEPROM). Any other suitable magnetic, optical, and/or semiconductor memory, such as a hard-disk drive (HDD) 312, by itself or in combination with other forms of memory, may be included in the memory area 304. The HDD 312 may also be coupled to a disk controller 314 for use in transmitting and receiving messages to and from the processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer architecture 300 also includes a display device 318 that is coupled, such as operatively coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touch-screen controller. The above examples are exemplary only and, thus, are not intended to limit in any way the definition and/or meaning of the term "display device."

In addition, the computer architecture 300 includes a network interface 322 for use in communicating with a network (not shown in FIG. 3). Moreover, the computer architecture 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

During operation, and if the viscous damping in the model is nonzero due to the nature of the simulation, the processor 302 solves the eigenvalue problem defined by Equation (21) or Equation (23) and transforms Equation (15) to Equation (22) or Equation (24), respectively. In an exemplary embodiment, the processor 302 calculates a plurality of square dense matrices that are invariant to the excitation frequency value and stores the square dense matrices in memory area 304. These invariant square dense matrices can be the powers of the matrix $\overline{B}$, in the case of simulation with zero viscous damping, or these matrices can be products of the square matrix G and diagonal matrix $\Gamma$ described above. In an exemplary embodiment, the processor 302 divides a plurality of excitation frequencies into a plurality of excitation frequency subsets. Referring to FIG. 1, and in an exemplary embodiment, the processor 302 effectively calculates solution for each frequency subset. Specifically, the processor 302 effectively calculates a nonsingular square matrix defined by Equation (9) using the pre-calculated invariant square dense matrices stored in the memory area, after that the processor 302 factorizes this matrix. The processor 302 then calculates solutions for each frequency in the subset performing forward and backward paths with the factorized matrix and calculating matrix-vector products. In the general case, the processor 302 calculates the solutions of transformed Equations (22) or (24), while in the special case of simulation with zero viscous damping the modal frequency response is obtained by this calculation. Thus, in an exemplary embodiment, after processing all subsets of frequencies, the processor 302 calculates the frequency responses at each frequency from the solution of transformed problem. Finally, the processor 302 generates a simulation of the real-world object based at least in part on the modal frequency responses. The simulation is then displayed to a user via display device 318.

Exemplary embodiments of computer-implemented methods, computer systems, computer devices, and computer program products for use in simulating a modal frequency response of a real-world object are described above in detail. The computer-implemented methods, computer systems, computer devices, and computer program products are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer or computer architecture, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Embodiments of the invention include computer program products having one or more non-transitory computer-readable storage media, wherein the media hold computer-executable components for use in simulating a modal frequency response of a real-world object. The computer-executable components include a division component that when executed by a processor causes the processor to divide a plurality of excitation frequencies into a plurality of excitation frequency subsets and store the excitation frequency subsets and the excitation frequencies assigned to each subset in a memory area. Moreover, in an exemplary embodiment, the computer-executable components include a calculation component that when executed by a processor causes the processor to effectively calculate modal frequency responses for at least a portion of the excitation frequencies in a given excitation frequency subset. The computer-executable components also include a simulation component that when executed by a processor causes the processor to generate a simulation of the real-world object based at least in part on the modal frequency responses.

In some embodiments, the division component also causes the processor to calculate a plurality of square dense matrices and store the plurality of invariant square dense matrices in the memory area. In some such embodiments, the calculation component also causes the processor to, for each of the plurality of excitation frequency subsets, calculate a nonsingular square matrix using the pre-calculated invariant square dense matrices, and factorize the nonsingular square matrix. Moreover, in some such embodiments, the calculation component causes the processor to, for each excitation frequency in a respective excitation frequency subset, calculate a frequency response solution matrix based on the corresponding nonsingular square matrix, and calculate the modal frequency response based on the frequency response solution matrix.

In some embodiments, the calculation component causes the processor to, for each excitation frequency in a respective excitation frequency subset, calculate a frequency response solution matrix and calculate the modal frequency response based on the frequency response solution matrix.

Although the present invention is described in connection with an exemplary simulation system environment, embodiments of the invention are operational with numerous other general purpose or special purpose simulation system environments or configurations. The simulation system environment is not intended to suggest any limitation as to the scope of use or functionality of any aspect of the invention. Moreover, the simulation system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of simulating a real-world object, the computer-implemented method comprising:
    calculating modal frequency responses of a real-world object for excitation frequencies in a plurality of excitation frequency subsets, each of the plurality of excitation frequency subsets providing a plurality of frequencies; and
    employing the calculated modal frequency responses in simulations of the real-world object by performing a simulation of the real-world object based at least in part on the calculated modal frequency responses, the simulation utilizing the calculated modal frequency responses as an accelerated means of calculation of modal frequency response in the plurality of frequencies.

2. The computer-implemented method of claim 1 further comprising:
    obtaining a set of excitation frequencies; and
    dividing the obtained set of excitation frequencies into the plurality of excitation frequency subsets.

3. The computer-implemented method of claim 1 further comprising:
    calculating a solution to an eigenvalue problem; and
    transforming a modal frequency response equation based on the eigenvalue problem solution.

4. The computer-implemented method of claim 3 further comprising:
    calculating a plurality of invariant square dense matrices using the transformed equation; and
    for each of the plurality of excitation frequency subsets, calculating a nonsingular square matrix.

5. The computer-implemented method of claim 4 further comprising:
    for each of the plurality of excitation frequency subsets, factorizing the nonsingular square matrix.

6. The computer-implemented method of claim 5 wherein calculating the modal frequency responses further comprises, for each excitation frequency in a respective excitation frequency subset:
    calculating a frequency response solution matrix based on the corresponding nonsingular square matrix; and
    calculating the modal frequency response based on the frequency response solution matrix.

7. The computer-implemented method of claim 6 wherein calculating the modal frequency responses further comprises, for each excitation frequency in a respective excitation frequency subset:
    performing forward and backward path analysis with the factorized nonsingular square matrix; and
    calculating a plurality of matrix vector products.

8. The computer-implemented method of claim 1 wherein calculating the modal frequency responses further comprises, for each excitation frequency in a respective excitation frequency subset:
    calculating a frequency response solution matrix; and
    calculating the modal frequency response based on the frequency response solution matrix.

9. A computer device for simulating a real-world object, said computer device comprising:
    a memory area; and
    a processor coupled to said memory area, the processor configured to:
        calculate modal frequency responses of a real-world object for excitation frequencies in a plurality of excitation frequency subsets, each of the plurality of excitation frequency subsets providing a plurality of frequencies; and
        employ the calculated modal frequency responses in simulations of the real-world object by performing a simulation of the real-world object based at least in part on the calculated modal frequency responses, the simulation utilizing the calculated modal frequency responses as an accelerated means of calculation of modal frequency response in the plurality of frequencies.

10. The computer device of claim 9 wherein said processor is further configured to:
    obtain a set of excitation frequencies; and
    divide the obtained set of excitation frequencies into the plurality of excitation frequency subsets.

11. The computer device of claim 9 wherein the processor is further configured to:
    calculate a solution to an eigenvalue problem; and
    transform a modal frequency response equation based on the eigenvalue problem solution.

12. The computer device of claim 11 wherein the processor is further configured to:
    calculate a plurality of invariant square dense matrices using the transformed equation; and
    for each of the plurality of excitation frequency subsets, calculate a nonsingular square matrix.

13. The computer device of claim 12 wherein the processor is further configured to:
    for each of the plurality of excitation frequency subsets, factorize the nonsingular square matrix.

14. The computer device of claim 13 wherein the processor is further configured, for each excitation frequency in a respective excitation frequency subset, to:

calculate a frequency response solution matrix based on the corresponding nonsingular square matrix; and calculate the modal frequency response based on the frequency response solution matrix.

15. The computer device of claim 14 wherein the processor is further configured, for each excitation frequency in a respective excitation frequency subset, to:

perform forward and backward path analysis with the factorized nonsingular square matrix; and calculate a plurality of matrix vector products.

16. The computer device of claim 9 wherein the processor is further configured, for each excitation frequency in a respective excitation frequency subset, to:

calculate a frequency response solution matrix; and calculate the modal frequency based on the frequency response solution matrix.

17. A computer program product executed by a server in communication across a network with one or more clients and comprising:

a non-transitory computer readable medium, the computer readable medium comprising program instructions for simulating a real-world object, the program instructions, when executed by a processor, causes the processor to:

calculate modal frequency responses of the real-world object for excitation frequencies in a plurality of excitation frequency subsets, each of the plurality of excitation frequency subsets providing a plurality of frequencies; and employ the calculated modal frequency responses in simulations of the real-world object by performing a simulation of the real-world object based at least in part on the calculated modal frequency responses, the simulation utilizing the calculated modal frequency responses as an accelerated means of calculation of modal frequency response in the plurality of frequencies.

18. The computer program product of claim 17 wherein, the program instructions, when executed by the processor, further cause the processor to:

obtain a set of excitation frequencies; and divide the obtained set of excitation frequencies into the plurality of excitation frequency subsets.

19. The computer program product of claim 17 wherein, the program instructions, when executed by the processor, further cause the processor to:

calculate a solution to an eigenvalue problem; and transform a modal frequency response equation based on the eigenvalue problem solution.

20. The computer program product of claim 19 wherein, the program instructions, when executed by the processor, further cause the processor to:

calculate a plurality of invariant square dense matrices using the transformed equation; and for each of the plurality of excitation frequency subsets, calculate a nonsingular square matrix.

* * * * *